Patented Oct. 10, 1939

2,176,011

UNITED STATES PATENT OFFICE 2,176,011

VAT DYESTUFFS IN FINELY DIVIDED FORM

Wilfred M. Murch and Le Roy G. Kline, Midland, Mich., assignors to The Dow Chemical Company, Midland, Mich., a corporation of Michigan No Drawing. Application September 15, 1938, Serial No. 230,158

5 Claims. (Cl. 260—703)

This invention relates to an improved method of preparing vat dyestuffs.

Vat dyes for use in textile coloring are usually marketed in the form of an aqueous paste or a powder containing the unreduced insoluble dye, together with wetting agents, e. g., polyhydric alcohols, dispersing agents such as sulphonic acids, and possibly other ingredients. For instance, in printing, the dye in paste form is incorporated with a printing gum, an alkaline agent, and a reducing agent, and the resulting composition is applied to the fabric being treated. The print is then developed by a steaming operation, wherein the dyestuff is reduced to the leuco form and becomes fixed to the fabric, followed by an oxidizing treatment, in which the colored dyestuff is regenerated in the fibers of the cloth. The printed fabric is then washed to remove excess dye and printing gum, rinsed carefully, and dried.

It has long been appreciated that the most satisfactory dyeings, both by printing and by the "pad-pigment" process, are obtained from pastes or powders in which the insoluble dyestuff is present in an extremely fine state of subdivision, particularly when the dye particles are of uniform small size. Two methods of decreasing the particle size of vat dyes are in common use, viz., a grinding process and a precipitation method. In the former, the dyestuff is subjected to prolonged grinding in a mill, and the ground dye is classified by screening. In the latter procedure, the vat dye is dissolved in sulfuric acid, and the solution is then "drowned", i. e., mixed rapidly with a large excess of cold water, the dyestuff being precipitated for the most part in finely divided form. Both these methods of subdivision are relatively unsatisfactory in that the resulting dyestuff is not entirely free of coarse particles, and that the finer particles are by no means uniform in size. As a result, the pastes prepared from such dyestuffs are far from being ideally suited to the printing of fabrics as described above.

We have now discovered that vat dyestuffs may be prepared in a much finer state of subdivision substantially free of coarse particles, and with a somewhat greater uniformity of particle size than has heretofore been possible, by an adaptation and extension of the sulfuric acid method hereinbefore discussed.

According to the invention, the vat dyestuff is dissolved in concentrated sulfuric acid; the solution so formed is atomized, i. e., broken up into a spray of minute droplets; and this atomized spray is then mixed with or "drowned" in a large excess of water. Presumably as a result of the atomizing step, the dyestuff precipitates in a state of extreme subdivision, substantially free of coarse particles. The insoluble dyestuff may then be recovered from suspension in the excess of water by filtration or otherwise, and worked up by usual procedures into dye-pastes and powders.

In preparing finely divided vat dyestuffs, we prefer to dissolve the dye in the concentrated sulfuric acid (90 per cent to 100 per cent $H_2SO_4$) in a proportion of not more than 2.5 parts by weight of dyestuff, suitably 1.0 to 2.0 parts, per 10 parts of acid. When more than about 2.0 to 2.5 parts of the dye are used, the resulting solution is in most instances too viscous to be atomized satisfactorily, and when less than 1.0 part of the dye is employed, the bulk of acid to be handled is unnecessarily large.

In practice, the sulfuric acid solution of the vat dyestuff may be converted into spray form in any usual atomizer, e. g., a spray nozzle, a centrifugal spray, or a simple air gun such as is employed in spraying paint. Similarly, any gaseous dispersing agent, e. g., compressed air, nitrogen, carbon dioxide, steam, etc., may be used to produce the atomizing action. In our process, the spray of vat dyestuff-solution issuing from the atomizer is directed against a water surface, thereby "drowning" the solution while in the form of individual droplets, and thus precipitating the dyestuff in a finer state of subdivision than has heretofore been obtained. The "drowning" effect may be achieved in any of several ways. Thus the atomized spray may simply be injected into the top of a closed vessel partly filled with water; the droplets of spray fall into the water and are "drowned". Alternately, the spray of dyestuff-solution may be injected into a tower down which a shower of water is falling.

The fineness of the vat dyestuff powder formed in our process is somewhat affected by the efficiency of the atomizer. By varying the size and shape of the nozzle, and the pressure of the gaseous dispersing agent, the dyestuff may be obtained in almost any desired particle size. It has been found that the greatest degree of subdivision is obtained when steam is used as the atomizing gas. It is probable that the steam assists in "drowning" the fine particles of solution while they are still in spray form and before they have opportunity to coalesce into larger droplets. That is, there is some evidence that, when using steam as the dispersing agent, the dyestuff particles are precipitatated at least in part even before the spray strikes the water surface. In this way, most vat dyestuffs may be obtained almost entirely in the form of particles having a diameter of less than about one micron. Vat dye powders and pastes prepared from such dyestuffs readily penetrate textile fibers and give excellent dyeings, particularly by the "pad-pigment" method.

Examples of vat dyes which may be subjected to treatment according to the invention are anthraquinone, indigoid, and thio-indigoid dyes, e. g. Ciba Blue 2BD (Colour Index 1184), Ciba Blue R (C. I. 1182), Indanthrene Blue BCS (C. I. 1114), Ciba Scarlet G (C. I. 1228), Indanthrene Yellow G (C. I. 1118), 5,5'-dichloro-7,7'-dimethyl-thioindigo, etc. Insofar as we are aware, any vat dye which is soluble in concentrated sulfuric acid without sulfonation, or mixture of such dyes, may successfully be treated in our new method.

Other modes of applying the principle of our invention may be employed instead of those explained, change being made as regards the details hereinbefore disclosed, provided the step or steps stated in any of the following claims, or the equivalent of such stated step or steps be employed.

We claim:

1. In a method of treating vat dyestuffs wherein the dyestuff is dissolved in concentrated sulfuric acid and the solution so formed is contacted with water to precipitate the dyestuff in finely divided form, the steps which comprise atomizing the sulfuric acid solution and contacting the resulting spray with water, whereby the dyestuff is obtained in an extremely fine state of subdivision.

2. In a method of treating vat dyestuffs wherein the dyestuff is dissolved in concentrated sulfuric acid and the solution so formed is contacted with water to precipitate the dyestuff in finely divided form, the steps which comprise atomizing the sulfuric acid solution using steam as the dispersing agent, and contacting the resulting spray with water, whereby the dyestuff is obtained in an extremely fine state of subdivision.

3. The method of obtaining vat dyestuffs in a uniform fine state of subdivision which comprises dissolving the dyestuff in sulfuric acid, atomizing the solution so obtained, contacting the atomized spray with water whereby the dyestuff is precipitated as an aqueous suspension of finely divided dyestuff particles, and recovering the dyestuff from the aqueous suspension.

4. The method of obtaining vat dyestuffs in a uniform fine state of subdivision which comprises dissolving less than 2.5 parts by weight of the dyestuff in 10 parts of concentrated sulfuric acid, atomizing the solution so obtained, contacting the atomized spray with water whereby the dyestuff is precipitated as an aqueous suspension of finely divided dyestuff particles, and recovering the dyestuff from the aqueous suspension.

5. The method of obtaining vat dyestuffs in a uniform fine state of subdivision which comprises dissolving between 1 and 2 parts by weight of the dyestuff in 10 parts of concentrated sulfuric acid, atomizing the solution so obtained using steam as the dispersing agent, contacting the atomized spray with water whereby the dyestuff is precipitated as an aqueous suspension of finely divided dyestuff particles, and recovering the dyestuff from the aqueous suspension.

WILFRED M. MURCH.
LE ROY G. KLINE.